United States Patent
Pischinger et al.

(10) Patent No.: US 6,425,356 B1
(45) Date of Patent: Jul. 30, 2002

(54) PISTON-TYPE INTERNAL-COMBUSTION ENGINE WITH THROTTLE-FREE LOAD CONTROL AND A DEVICE FOR GENERATING A VACUUM, AND METHOD FOR OPERATING THE DEVICE

(75) Inventors: Martin Pischinger, Aachen; Markus Duesmann; Enno Lohse, both of Stolberg; Michael Schebitz, Eschweiler; Wolfgang Salber, Aachen, all of (DE)

(73) Assignee: FEV Motorentechnik GmbH, Aachen (DE)

( * ) Notice: Subject to any disclaimer, the term of this patent is extended or adjusted under 35 U.S.C. 154(b) by 0 days.

(21) Appl. No.: 09/600,314

(22) PCT Filed: Nov. 11, 1999

(86) PCT No.: PCT/EP99/08658

§ 371 (c)(1),
(2), (4) Date: Sep. 5, 2000

(87) PCT Pub. No.: WO00/29734

PCT Pub. Date: May 25, 2000

(30) Foreign Application Priority Data

Nov. 13, 1998 (DE) ........................................ 198 52 389

(51) Int. Cl.$^7$ ................................................. F01L 1/34
(52) U.S. Cl. .................... 123/90.15; 123/337; 123/347; 123/348; 123/184.56; 123/403
(58) Field of Search ................................ 123/337, 347, 123/348, 184.56, 184.21, 403, 90.15, 90.16, 90.17, 90.18

(56) References Cited

U.S. PATENT DOCUMENTS

| 2,066,544 | A |   | 1/1937 | Shaw |
| 4,096,211 | A |   | 6/1978 | Rameau |
| 4,465,034 | A | * | 8/1984 | Tsutsumi ..................... 123/306 |
| 4,794,885 | A | * | 1/1989 | Honda ..................... 123/52 M |
| 4,899,708 | A | * | 2/1990 | Jung ........................... 123/331 |
| 5,181,484 | A | * | 1/1993 | Kan ......................... 123/90.17 |
| 5,216,985 | A | * | 6/1993 | Brummer ............... 123/52 MC |
| 5,662,086 | A | * | 9/1997 | Piccinini ..................... 123/403 |

FOREIGN PATENT DOCUMENTS

| DE |   1119047 | 12/1961 |
| DE |  24 51 064 | 12/1975 |
| JP |  60153437 |  8/1985 |
| WO |  91/16529 | 10/1991 |

* cited by examiner

Primary Examiner—Thomas Denion
Assistant Examiner—Jaime Corrigan
(74) Attorney, Agent, or Firm—Venable; Gabor J. Kelemen

(57) ABSTRACT

The present invention relates to a piston-type internal combustion engine comprising gas-exchange valves which can be driven in a completely variable manner by a motor control (2) and which communicate with an air supply channel (4) provided with a device (6) for generating a negative pressure using the energy components of the air flowing through said air supply channel (4). This device is provided with means that can be driven for adaptation to the modifications in the flow energy which are inherent to the operation, and communicates with at least one negative-pressure user (8, 9, 10) through at least one negative-pressure duct (7).

9 Claims, 5 Drawing Sheets

PISTON-TYPE INTERNAL-COMBUSTION ENGINE WITH THROTTLE-FREE LOAD CONTROL AND A DEVICE FOR GENERATING A VACUUM, AND METHOD FOR OPERATING THE DEVICE

DESCRIPTION

In motor vehicles having piston-type internal-combustion engines in which the load control is effected by way of a controllable throttle device in the air-supply conduit, it is known to utilize the vacuum forming behind the throttle device—seen in the air flow direction—in specific operating states when the device is only partially open in order to act appropriately on "vacuum consumers" in the vehicle. The term "vacuum consumers" in the sense of the present invention encompasses, for example, an exhaust-gas recirculation system, a power brake unit, a backwash active-charcoal filter of a fuel-tank ventilation system, etc. . . .

Systems for piston-type internal-combustion engines of this type, in which a bypass conduit is provided for bridging the region of the throttling device, the conduit having a bottleneck that is embodied in the manner of a Venturi tube, are known from DE-B-27 17 685 and DE-A-195 03 568. A vacuum line, which is connected to the vacuum consumer, terminates in the region of the bottleneck. Due to the pressure difference between the region of the air-supply conduit in front of the throttling device, where the pressure is high, and the region of the air-supply conduit behind the throttling device, where the pressure is low, an air current is forcibly created in the bypass conduit, which leads to a drop in the static pressure due to the increase in speed in the region of the bottleneck; this condition can then be utilized by the vacuum consumer.

In piston-type internal-combustion engines in which the load control is effected by way of a variable actuation of the cylinder valves or a regulation of the mixture quality, that is, a regulation of the mixture composition, or in which the fuel is injected directly into the cylinders, the absence of a throttle valve in the air-supply conduit means that an inadequate vacuum is available to the vacuum consumers of a motor vehicle over the entire load range of the piston-type internal-combustion engine, the consumers being indispensable for the operation of the engine. To provide these vacuum consumers with a sufficient vacuum, it has been necessary to this point to generate the vacuum externally via additional vacuum pumps.

Because such additional aggregates are relatively costly, and require corresponding, additional drive energy, it is the object of the invention to embody a piston-type internal-combustion engine with a throttle-free load control such that vacuum generators consuming additional drive energy can be omitted.

According to the invention, this object is accomplished by a piston-type internal-combustion engine having cylinder valves that are completely variably actuatable via a valve timing, and are connected to an air-supply conduit that is provided with a device for generating a vacuum by utilizing energy components of the air flowing through the air-supply conduit, the device being equipped with controllable elements for adaptation to changes in the flow energy as dictated by operating conditions, and being connected by way of at least one vacuum line to at least one vacuum consumer. With this measure, the energy components inherent in the air flow in the air-supply conduit can be directly incorporated into the generation of the vacuum.

In this device, the energy components that are utilized are, on the one hand, the flow speed of the air flowing through the air-supply conduit, which is specifically utilized through an increase in the flow speed, which correspondingly leads to a drop in the static pressure, and/or through the utilization of pulse-like pressure fluctuations that occur in the air flow in the air-supply conduit due to the periodic opening of the gas intake valves. Depending on the conditions, these fluctuations cause the pressure to exceed and fall below the ambient pressure by a "zero level." This principle of the invention can be realized in different embodiments.

In a first embodiment of the invention, it is provided that the device includes an air-supply conduit, through which air flows, and which has at least one cross-sectional bottleneck that is formed in the region of the termination of the vacuum line, and that controllable elements are provided for setting different cross-sectional bottlenecks. With such a cross-sectional bottleneck, which should have a flow contour that keeps flow losses as low as possible, and should accordingly be embodied in the manner of a Venturi tube, the speed of the air flowing in the air-supply conduit increases, which causes a drop in the static pressure in the air flow relative to the ambient pressure of the air-supply conduit. Thus, it becomes possible to make available the vacuum that is necessary, for example, for a power brake unit, with low pressure losses in the air-supply conduit, or to generate the pressure drop that is necessary for exhaust-gas recirculation and/or the backwash of an active-charcoal filter of a fuel-tank ventilation system for suctioning exhaust gas and/or fuel-containing air into the air-supply conduit via the active-charcoal filter.

If the cross-sectional bottleneck is designed such that a sufficient vacuum can be generated in the air-supply conduit at low rpms, and thus with low mass currents, large flow resistances and therefore drops in power occur in the air-supply conduit at high rpms and with large mass currents. To counteract this, the cross-sectional bottleneck has a variable free flow cross section; controllable elements, which can be actuated, for example, via the valve timing, effect an adaptation to the respective operating state; and the flow resistance can be kept low for the different operating states, i.e., the different rpm ranges.

One embodiment of the invention provides that the air-conduit region has at least two parallel conduits, each with a cross-sectional bottleneck, which are connected at least on the exhaust side to the air-supply conduit. The cross-sectional bottlenecks vary in size, and a controllable actuating element is provided for selective guidance of the air flow through the parallel conduits. Thus, a simple adaptation is possible for at least two different rpm ranges. For the lower rpm range, the actuating element is correspondingly actuated, and the parallel conduit having the cross-sectional bottleneck with the small flow cross section is opened, and for the upper rpm range, the parallel conduit having the cross-sectional bottleneck with the larger free flow cross section is opened, so an appropriate drop in the static pressure is assured in the region of the termination of the vacuum line for both rpm ranges, yet the flow resistances dictated by the cross-sectional bottleneck are minimized.

The actuating element can be formed by a throttle valve disposed in front of the branch of the parallel conduits; this valve selectively enables one of the two parallel conduits for the air flow, but can also be set such that air flows through both parallel conduits, so three rpm ranges can be covered with two parallel conduits. For the low rpm range, the parallel conduit having the smaller flow cross section in the region of the cross-sectional bottleneck is enabled; for a middle rpm range, the other parallel conduit with the larger free flow cross section is enabled; and for an upper rpm range, the throttle valve is set such that both parallel conduits are enabled, so air can flow through them. The effected increase in the air resistance, and the associated loss of power, are maintained within acceptable limits.

In another embodiment of the invention, it is provided that the air-conduit region having a cross-sectional bottleneck has at least one movable wall region in the region of the termination of the vacuum line for changing the free flow cross section of the cross-sectional bottleneck. The movable wall region is connected to controllable actuating elements. With this arrangement, it is possible to precisely adapt the free flow cross section in the region of the cross-sectional bottleneck, with the aid of the valve timing, for example, to the respective air-mass current flowing through the air-supply conduit, hereby maintaining a minimum vacuum. It is also possible to change the flow cross section in order to keep the flow resistance as low as possible in the region of the cross-sectional bottleneck by correspondingly adapting the free flow cross section.

The term "movable wall region" in the sense of the invention covers embodiments in which the geometry of at least parts of the conduit wall is variable in the region of the cross-sectional bottleneck due to pivoting or elastic deformation. In a square or rectangular conduit cross section, for example, it suffices for the controllable actuating element to pivot, displace and/or deform only one conduit wall into the flow cross section, transversely to the flow direction, in the region of the termination of the vacuum line. In one embodiment of the wall region that limits the cross-sectional bottleneck through elastic materials, such as rubber-elastic, deformable inserts, or flexible, rotatable lamella that overlap in the circumferential direction and extend toward one another in the flow direction, or the like, it is possible to effect a practically symmetrical change in the free flow cross section relative to the termination of the vacuum line.

In a further inventive modification, particularly in connection with a variable free flow cross section, it is provided that the device for utilizing pressure fluctuations in the air flowing through the air-supply conduit has a pressure rectifier, which is connected, on the one hand, to the air-supply conduit by way of the vacuum line, and, on the other hand, to the vacuum consumer, and has a shut-off valve, which only opens periodically when a vacuum exists in the air-supply conduit.

This modification of the inventive principle also utilizes an inherent energy component of the air flow in the air-supply conduit. Here, however, a pressure drop due to a local increase in the flow speed of the air flow is not utilized, but rather the fact that considerable pressure fluctuations can be detected in the air-supply conduit over the entire operating range of a piston-type internal-combustion engine. These pressure fluctuations can be attributed to pulse-type pressure waves that are formed by the periodic opening and closing of the gas-intake valves. The arising pressure waves fluctuate around the value of the ambient pressure, and thus at least intermittently fall below this value. Surprisingly, it was found that falling below the ambient pressure suffices for generating a vacuum level for subordinate systems. The provided pressure rectifier with the shut-off valve ensures that a connection only exists between the air-supply conduit and the vacuum consumer if a vacuum relative to the ambient pressure is also present in the air-supply conduit.

The shut-off valve can also be embodied as a check valve, so it automatically opens when a vacuum is present, and closes in the overpressure range of the present pressure wave. It is especially advantageous, however, for the shut-off valve to be connected to a controllable actuating drive. Whereas, in a conventional, spring-loaded check valve, a minimal vacuum must be present before the valve even opens, and the valve must already re-close when a vacuum is still present, a shut-off valve having a controllable actuating drive offers the advantage that the opening and closing times of the shut-off valve can be purposefully established for practically completely utilizing the time interval in which a vacuum is present in the air-supply conduit. This can be advantageous, for example, if the connected vacuum consumer is a fuel-tank ventilation system or an exhaust-gas recirculation system. In both cases, it is crucial that the shut-off valve remain open as long as possible in order to introduce a sufficient mass current into the air-supply conduit by way of the vacuum line. Accordingly, the shut-off valve is opened when the pressure wave passes through the "zero level" in the direction of an increasing vacuum, and the valve is closed shortly before the wave passes through the "zero level" again in the direction of a vacuum.

Because the frequency of the pressure wave is a function of the rpm, and the above-described "zero passages" change accordingly, but the conditions in the air-supply conduit also influence the temporal course of the pressure waves, it is advantageous for the actuating drive of the shut-off valve to be controlled as a function of pressure. This can be effected, for example, by way of the valve timing, with a pressure sensor that is wired to the valve timing being disposed in the immediate vicinity of the termination of the vacuum line, by way of which sensor the opening and closing times for the shut-off valve can be signaled, and the actuating drive can be actuated accordingly via the valve timing.

The invention further relates to a method for influencing the energy components of the air flowing in the air-supply conduit that are present in the form of pressure fluctuations of the vacuum generators in a piston-type internal-combustion engine, with a device for generating a vacuum, which is equipped in accordance with the aforementioned features.

According to the invention, it is provided that the valve timing actuates the opening and closing times, at least of the gas-intake valves, so as to intensify the pressure fluctuations occurring periodically in the air-supply conduit due to operating conditions. This method employs the option of purposefully changing the opening and closing times of cylinder valves that can be controlled completely variably, because the variation options are only limited by the further operating capability of the piston-type internal-combustion engine.

In a particularly advantageous embodiment of the method, it is provided that a pressure pulse that intensifies the vacuum component of the periodic pressure fluctuations of the air flowing in the air-supply conduit is generated by the actuation of the gas-intake valves with a "delayed intake opening." If the gas-intake valves of the individual cylinders are opened late (SEÖ), in other words, if the piston approaches its lower dead-center position, first a distinct vacuum is created in the cylinder, so when the gas-intake valve is opened, the air is sucked from the air-supply conduit at a high flow speed. This high flow speed continues into the air-supply conduit. If the gas-intake valve is then closed, the reflux effects a certain pressure increase, but the pressure then correspondingly diminishes when the next gas-intake valve is opened late again. This causes distinct pressure waves to form in the air-supply conduit.

This pressure pulsation that is superposed over the air flow in the air-supply conduit can be further intensified if, in an embodiment of the method of the invention, the overpressure. component of the periodic pressure fluctuations of the air flowing in the air-supply conduit is generated by an actuation of the gas-exhaust valves with an "early exhaust closure," and an actuation of the gas-intake valves by the intake opening in the upper dead-center region. In this actuation, a slight overpressure is generated in the last movement phase of the piston prior to reaching upper dead center in the combustion chamber. This overpressure, as an increasing pressure shock, then builds up a pressure pulse in the opposite direction of the air flow in the air-supply conduit when the intake valve is opened; the pressure pulse subsequently decreases as the flow speed in the air-supply conduit correspondingly increases, falling considerably below the ambient pressure in the process. Because air is a compressible medium, the above-described influencing of the opening times permits the pressure fluctuations of the air flowing in the air-supply conduit to be increased by the "zero level" and, accordingly, permits an increase in the usable vacuum.

The invention is described in detail below in conjunction with schematic drawings.

Figure 1:
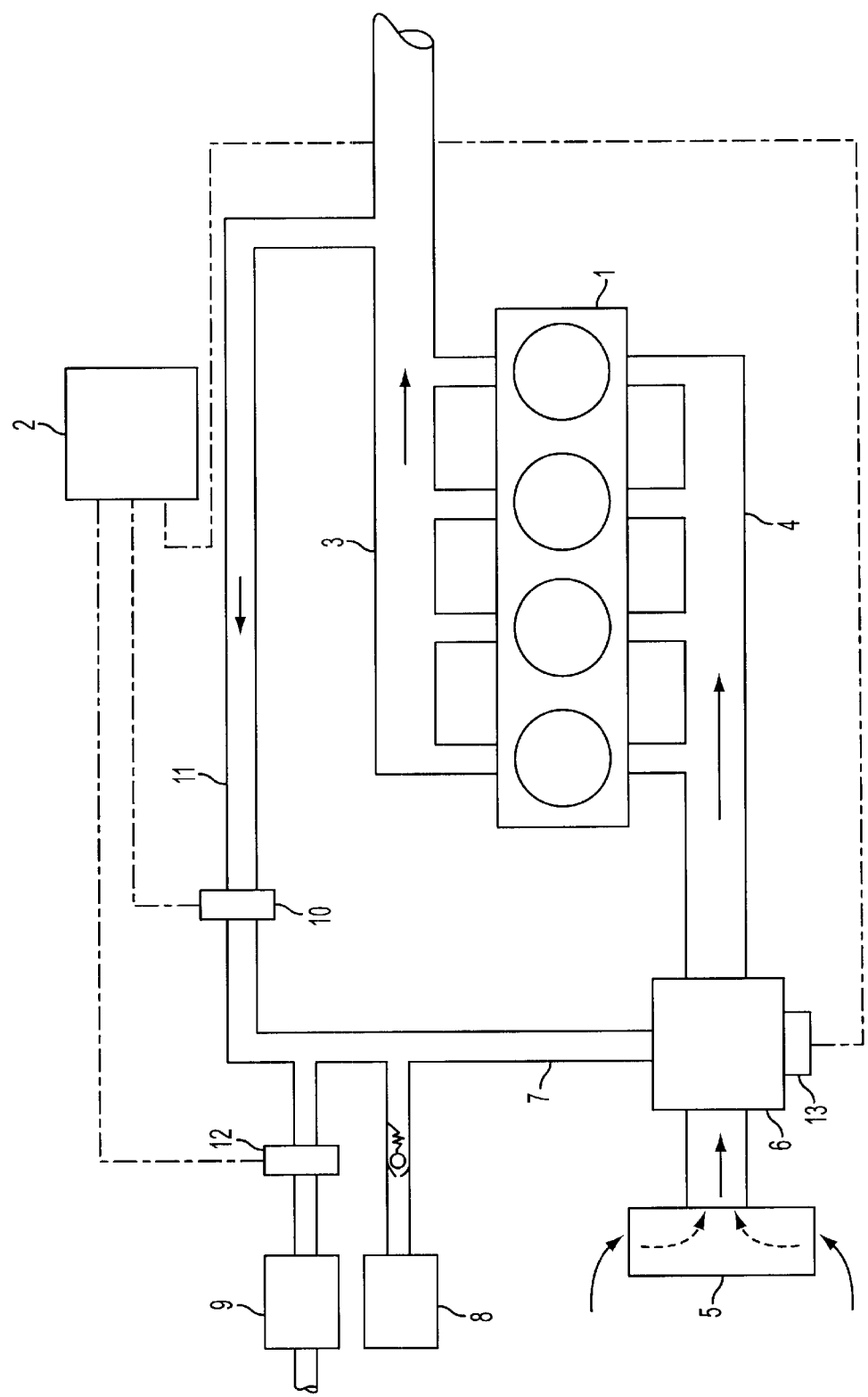
FIG. 1 shows a four-cylinder, piston-type internal-combustion engine.

FIG. 1 schematically illustrates a four-cylinder, piston-type internal-combustion engine 1, which is provided with cylinder valves that can be controlled completely variably. A valve timing 2 actuates the valve drives of the cylinder valves. On the side of the exhaust gas, the individual cylinders are connected to an exhaust-gas conduit 3. On the suction side, the individual cylinders of the piston-type internal-combustion engine 1 are connected to an air-supply conduit 4. The air-supply conduit 4 is provided on the intake side with an air filter 5. Because no sufficient vacuum for acting upon "vacuum consumers" is available in the air-supply conduit 4 in such a piston-type internal-combustion engine having a throttle-free load control due to the absence of a controllable throttle device for controlling the load, a separate device 6 is provided in the air-supply conduit 4 for generating a vacuum; various embodiments of the function and design of this device will be described in detail below.

The device 6 for generating a vacuum is connected by way of a vacuum line 7 to vacuum consumers. As indicated schematically here, these consumers can be, for example, a power brake unit 8, a fuel-tank ventilation system provided with an active-charcoal filter 9, an exhaust-gas recirculation device, indicated here by the exhaust-gas recirculation valve 10, or similar vacuum consumers. With the vacuum generated in the device 6, it is thus possible to act upon the power brake unit with a corresponding vacuum, on the one hand, and to control the exhaust-gas recirculation valve 10 corresponding to the actuation by the valve timing 2, on the other hand, for introducing exhaust gases into the air-supply conduit 4 from the exhaust-gas conduit by way of an exhaust-gas recirculation line 11 and the vacuum line 7 in order to meet the load requirements.

A corresponding actuation of a valve 12 by way of the valve timing 2 permits the backwash of the active-charcoal filter 9 of the fuel-tank ventilation system from time to time, and the suctioning off of hydrocarbons that have deposited in the active-charcoal filter 9 and the supply of these substances to the engine by way of the combustion air.

Figure 2:
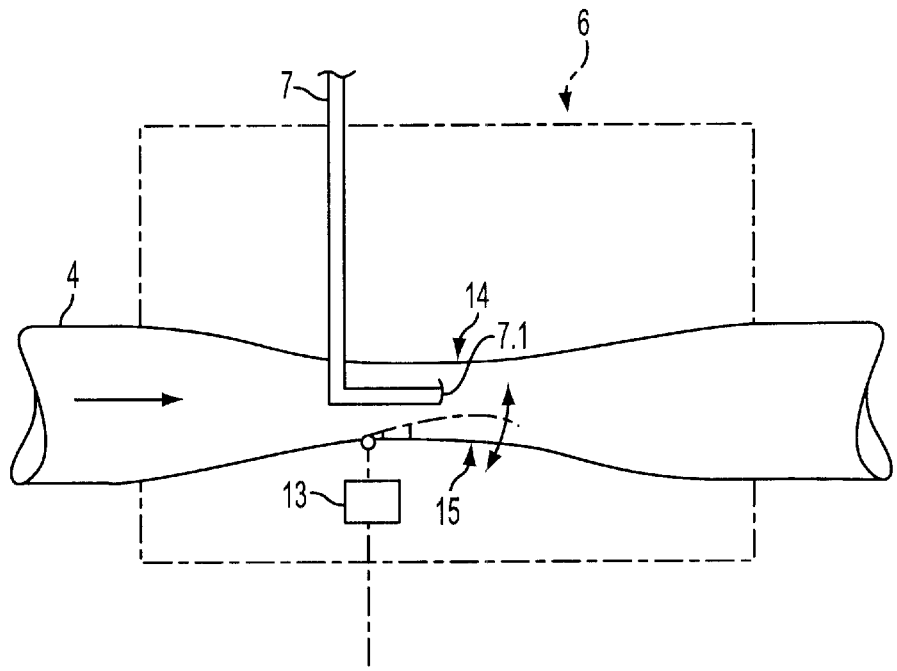
FIG. 2 shows a first embodiment for a vacuum device, in the form of a Venturi bottleneck.

The device 6 can be connected to additional elements 13, which are only indicated here and are explained in conjunction with FIG. 2, for altering the existing vacuum with the valve timing 2.

FIG. 2 schematically shows a first embodiment of a device 6 for generating a vacuum. The device essentially comprises a cross-sectional bottleneck 14 of the air-supply conduit 4, which is embodied in the manner of a Venturi 5 tube. The termination 7.1 of the vacuum line 7 is located at the narrowest point of the cross-sectional bottleneck, so a vacuum is generated by the drop in the static pressure in the flow relative to the ambient temperature, which is associated with the local increase in the flow speed of the combustion air in the air-supply conduit 4 in this region; this vacuum reaches the connected vacuum consumer by way of the vacuum line 7.

Because the free flow cross section of the cross-sectional bottleneck must be designed such that, at low rpms with a correspondingly-low flow speed, a sufficient vacuum continues to be present at the vacuum line 7, at higher rpms this forces an increase in the flow resistance effected by the cross-sectional bottleneck; this increase can no longer be disregarded, and ultimately leads to losses of power. To remedy this, a device for changing the free flow cross section is schematically indicated in FIG. 2. It can be formed by, for example, a wall element 15 that is provided with an actuating drive 13, and can change the flow cross section in the region of the termination of the vacuum line 7, so the device 13, 15 can adapt the flow speed of the air and therefore the vacuum present at the vacuum line 7 with a low load requirement with a low flow speed, as well as with a high load requirement with a high flow speed, in the narrow point in the air-supply conduit 4. As indicated in FIG. 2, the alteration of the free flow cross section can be effected by a wall element. It is also possible, however, to embody the segment of the air-supply conduit that forms the Venturi tube such that the entire free flow cross-section can be altered by the deformation of the wall. This can be effected, for example, by tightly inserting a rubber-elastic tube element in this region, which is correspondingly narrowed or widened by the effect of a overpressure or vacuum on the space between the tube element and the conduit wall, so the free flow cross section can be changed correspondingly in the region of the termination 7.1 of the vacuum line inserted axially into the cross-sectional bottleneck. In the same way, it is also possible to provide a corresponding insert in the form of a lamellar tube comprising a plurality of flexible lamella, which are respectively seated with their end sides on a ring. The rotation of the end-side rings toward one another with a simultaneous axial displacement likewise permits the alteration of the free flow cross section. It is advantageous for the adjacent lamella to extensively overlap tightly.

Figure 3:
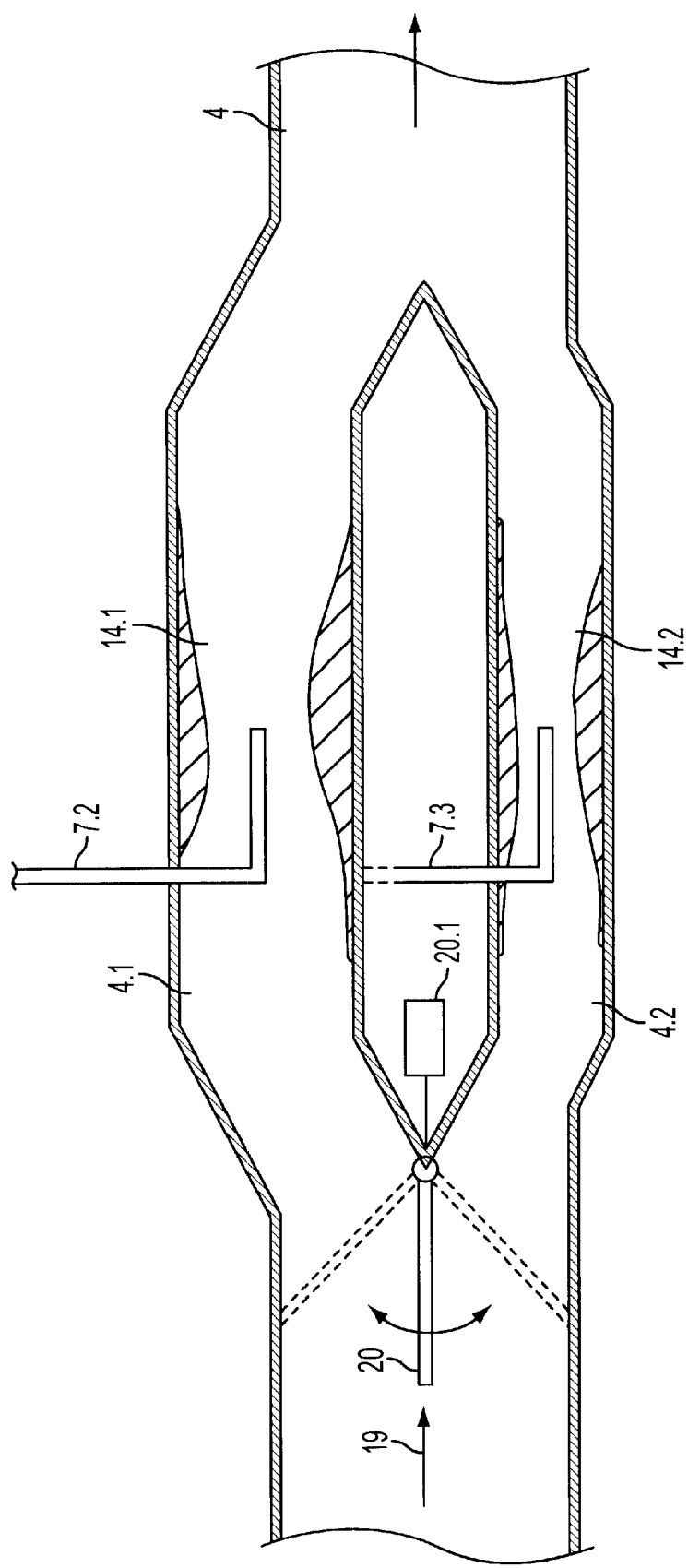
FIG. 3 shows a modification of the embodiment according to FIG. 2, with parallel conduits.

FIG. 3 illustrates a modification of the embodiment according to FIG. 2. In this embodiment, the air-supply conduit 4 is divided into two parallel conduits 4.1 and 4.2, which have a cross-sectional bottleneck 14.1 and 14.2, respectively, into which a vacuum line 7.2 or 7.3 terminates in the described manner. In this arrangement, the cross-sectional bottlenecks 14.1 and 14.2 are fixedly preset, with the cross-sectional bottleneck 14.1 in the parallel conduit 4.1 having a larger free flow cross section than the cross-sectional bottleneck 14.2 in the parallel conduit 4.2.

If the arrangement is flowed through in the direction of the arrow 19, an actuating element 20, in the form of a pivoting valve, for example, is disposed in the region of the division into the two parallel conduits 4.1 and 4.2. An actuating drive 20.1 can pivot this actuating element to the right or left from the illustrated center position, so air flows either through both parallel conduits 4.1 and 4.2 or alternatingly through the parallel conduit 4.1 or 4.2. Thus, it is possible to cover three rpm ranges with air-mass throughputs of varying magnitudes in the air-supply conduit 4 with acceptable flow resistances that are effected by the cross-sectional bottlenecks 14.1 or 14.2.

Figure 4:
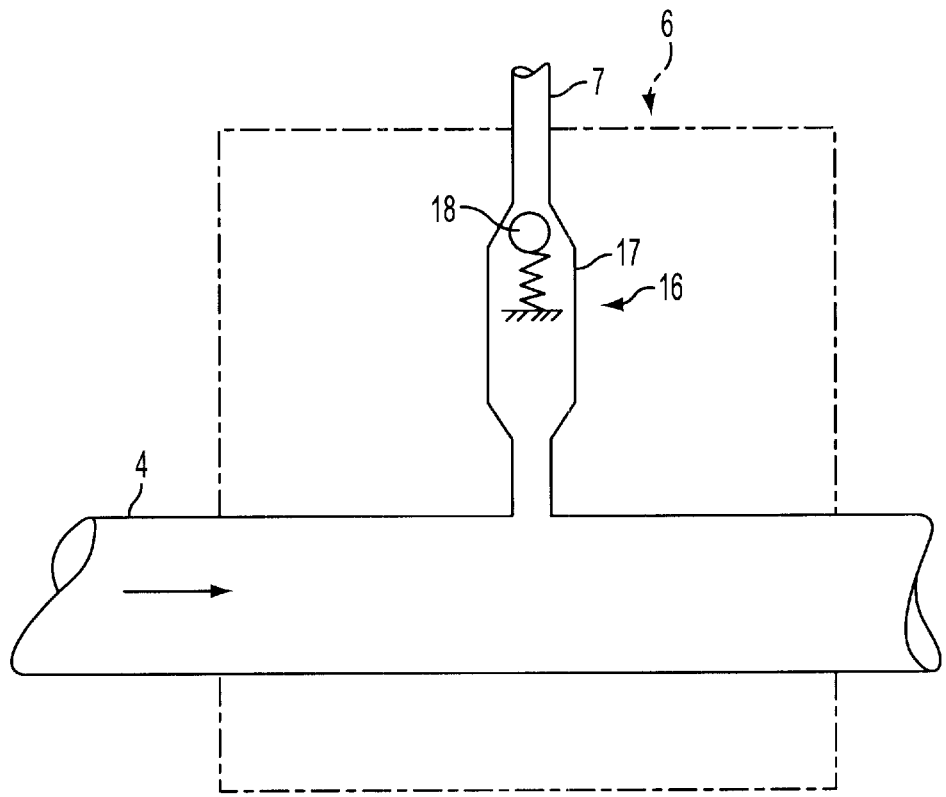
FIG. 4 shows a different embodiment of the vacuum device, in the form of a pressure rectifier with a shut-off valve.
Figure 6:
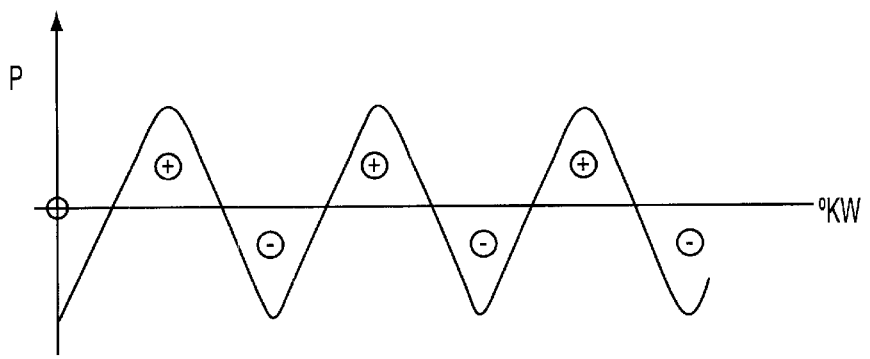
FIG. 6 shows the course of the pressure fluctuations in the air-supply conduit.

FIG. 4 illustrates an embodiment for a vacuum generator 6, which harnesses pressure fluctuations in the air-supply conduit 4 for generating a vacuum. The generator essentially comprises a pressure rectifier 16, which is disposed in the vacuum line 7 and has a flow housing 17, in which a shut-off valve 18, here in the form of a check valve, is disposed, the valve only opening when a vacuum is present in the air-supply conduit 4. Because pressure fluctuations occur periodically in the air-supply conduit 4 due to the intermittent air suction of the individual cylinders of the piston-type internal-combustion engine, with the magnitude of the fluctuations varying around the dominant ambient pressure, that is, being apparent periodically as an overpressure and a vacuum in the air-supply conduit, as shown in FIG. 6, the pressure rectifier 16 offers the possibility that the check valve 18 will open when a vacuum is present in the region of the termination of the vacuum line 7 into the air-supply conduit 4, and a vacuum will correspondingly be available for the above-described vacuum consumers.

As is only indicated in the drawing, it is also possible here to exert an influence by altering the flow cross section in the region of the termination of the vacuum line 7 by way of an additional device 13, 15, with the aid of the valve timing 2, for influencing the vacuum present at the vacuum line 7 in addition to the effect of the pressure rectifier 16.

Figure 5:
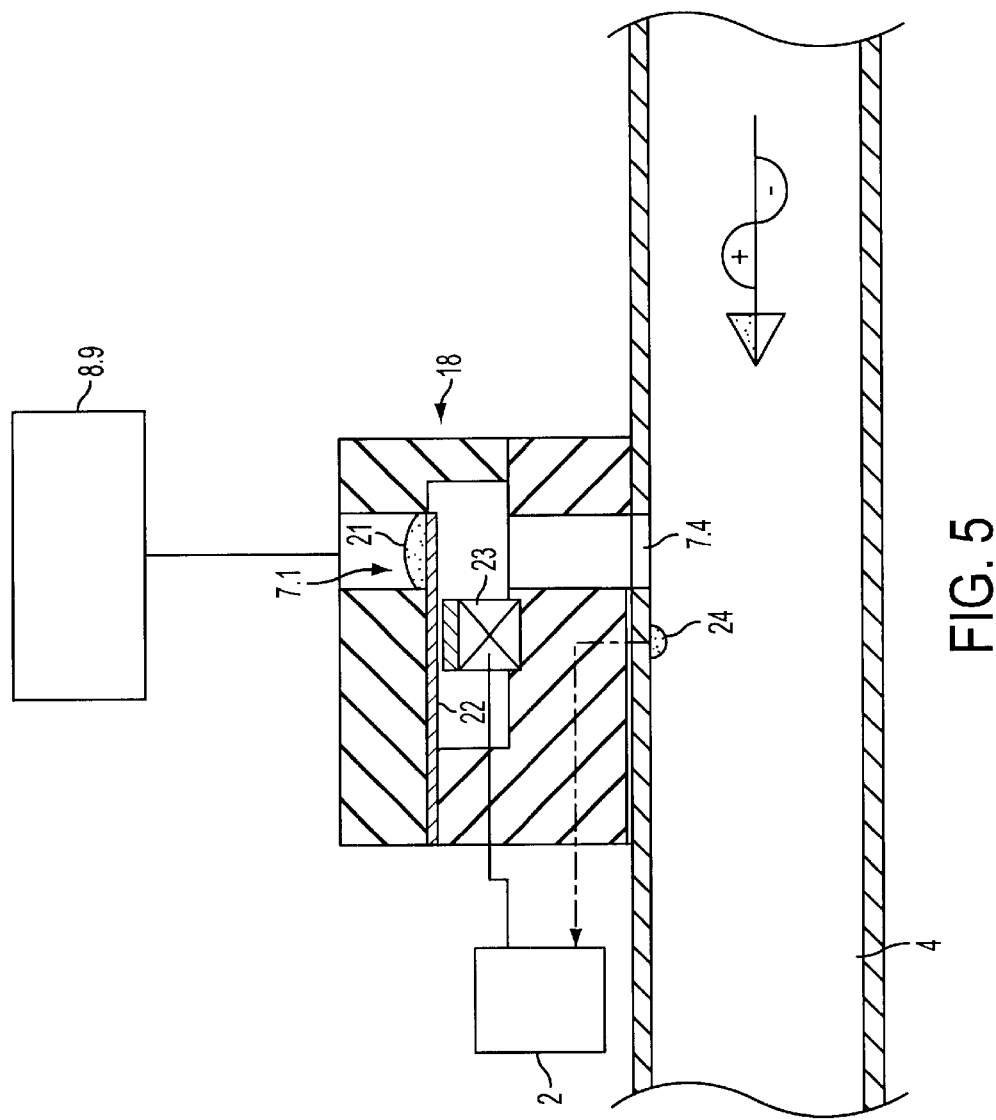
FIG. 5 shows an embodiment with a controllable shut-off valve for utilizing pressure fluctuations.

The described embodiment illustrated in FIG. 4 can be modified such that the shut-off valve 18 is embodied as a controllable valve, as shown in FIG. 5. The embodiment illustrated here includes a valve body 21, which is held on a spring arm 22. Depending on the application, the arrangement can be such that, in the closed position, the spring arm 22 presses the valve body 21 toward the termination 7.1 of the vacuum line 7, which is embodied as a valve seat. For opening the valve, an electromagnet 23 is supplied with current, and attracts the spring arm 22, which is simultaneously embodied as an armature. The electromagnet 23 is actuated such that the valve is respectively opened when a vacuum wave is present in the air-supply conduit 4 in the region of the termination 7.4 into the air-supply conduit 4. As soon as this vacuum drops below a preset measure, the current supply to the electromagnet 23 is cut off, so the valve body 21 is again seated on the valve seat 7.1 due to the effect of the spring force of the spring arm 22, and closes the valve. The subsequent pressure increase in the air-supply conduit supports the closing effect, which ensures that the shut-off valve only opens during a pressure drop, and the vacuum consumer is connected to the air-supply conduit 4.

The electromagnet 22 [sic] can be supplied with current by way of a corresponding control device, for example the valve timing 2, which may detect the pressure course of the air flow by way of a pressure gauge 24 in the air-supply conduit 4. The pressure gauge 24 should be disposed as closely as possible to the termination 7.2 of the overpressure line so that it can directly detect the pressure level in this region.

FIG. 6 schematically shows the course of the pressure fluctuations in the air-supply conduit 4. The "zero level" approximately corresponds to the ambient pressure, resulting in an overpressure and a vacuum that fluctuate around the line of the ambient pressure corresponding to the illustrated course. The frequency of the pressure fluctuations is a function of the number of cylinders of the relevant piston-type internal-combustion engine, and the rpm, so the representation here is dependent on the degree of the crank angle.

Figure 7:
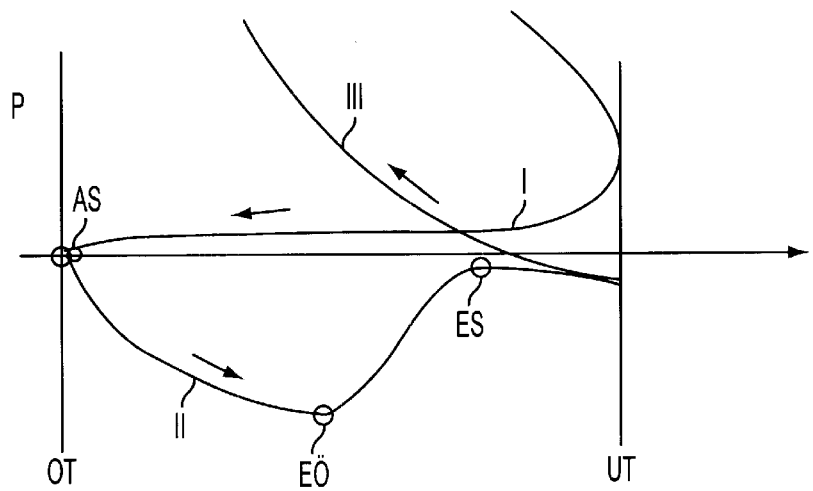
FIG. 7 shows the course of the cylinder pressure in a "delayed intake opening."

FIG. 7 particularly shows a way of influencing the pressure course in the air-supply conduit 4 through a purposeful actuation of the cylinder valves by way of the valve timing in order to generate a vacuum with a device according to FIGS. 4 or 5.

If the respective opening time of the gas-intake valves is actuated with a "delayed intake opening " (SEÖ), the result is the course of the internal cylinder pressure between the upper and lower dead-center positions, as shown schematically in FIG. 7. The curve runs in the direction of the arrows. The curve region I represents the exhaust phase. When the lower dead-center position is reached, the exhaust closes (AS), while the intake remains closed. In the downward movement toward the lower dead-center position, the intake opens with a delay, for example at the illustrated time (EÖ), so the air is suctioned out of the air-supply conduit 4 at a high speed following a dramatic drop in pressure inside the cylinder when the gas-intake valve is opened. The suction phase II ends with the closing of the intake valve (ES), so the sealing phase III can begin.

Figure 8:
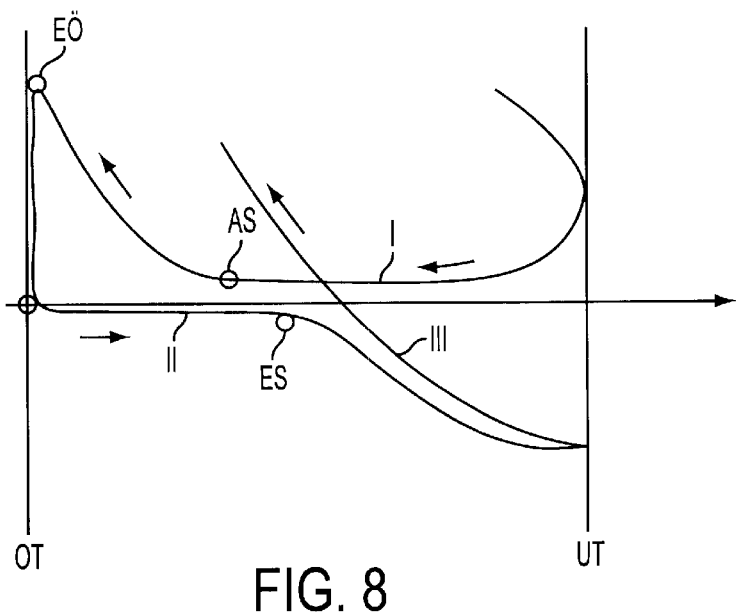
FIG. 8 shows the course of the cylinder pressure in an "early exhaust closure."

FIG. 8 illustrates a different method. During the exhaust phase I, the gas-exhaust valve closes before the upper dead-center position is reached, so when the intake valve is closed, a corresponding pressure increase takes place inside the cylinder. In or shortly before the upper dead-center position, the intake valve opens (EÖ), so the overpressure created inside the cylinder first decreases into the air-supply conduit 4; then, air is suctioned into the cylinder with a practically unchanging pressure until the intake valve closes at the time (ES), thereby ending the suction phase II. The sealing phase III is effected again after the lower dead-center position has been passed through.

It ensues from the diagrams of FIGS. 7 and 8 that these measures can be implemented to exert a stronger influence on the profile of the pressure fluctuations in the air-supply conduit 4, as schematically shown in FIG. 6, on both the overpressure side and the vacuum side, so the respective severe changes in pressure effect local, corresponding increases in the flow speed, which can be advantageously utilized in generating a vacuum.

What is claimed is:

1. A piston-type internal-combustion engine having cylinder valves, which can be actuated completely variably by way of a valve timing (2) and are connected to an air-supply conduit (4), which is provided with a device (6) for generating a vacuum by utilizing energy components of the air flowing through the air-supply conduit (4), the device being provided with controllable elements for adapting to changes in the flow energy as dictated by operating conditions, the device further being connected to at least one vacuum consumer (8, 9, 10) by way of at least one vacuum line (7); said air-supply conduit having at least two parallel conduits (4.1, 4.2), which respectively have a cross-sectional bottleneck (14.1, 14.2) that is connected, at least on the exhaust side, to the air-supply conduit (4), with the cross-sectional bottlenecks (14.1, 14.2) being of different sizes, and with a controllable actuating element (20) being provided for selective guidance of the air flow through the parallel conduits (4.1, 4.2).

2. The piston-type internal-combustion engine according to claim 1, characterized in that the air-supply conduit (4) having a cross-sectional bottleneck (14) has at least one movable wall region (15) in the region of the termination (7.1) of the vacuum line (7) for altering the free flow cross section of the cross-sectional bottleneck (14), which is connected to controllable actuating elements (13).

3. A piston-type internal-combustion engine having cylinder valves, which can be actuated completely variably by way of a valve timing (2) and are connected to an air-supply conduit (4), which is provided with a device (6) for generating a vacuum by utilizing energy components of the air flowing through the air-supply conduit (4), the device being provided with controllable elements for adapting to changes in the flow energy as dictated by operating conditions, the device further being connected to at least one vacuum consumer (8, 9, 10) by way of at least one vacuum line (7); the device for utilizing energy components in the air flow that are present in the form of pressure fluctuations of the air flowing through the air-supply conduit (4) having a pressure rectifier (16) connected by way of the vacuum line (7) to the air-supply conduit (4), and having a shut-off valve (18) which only opens periodically when a vacuum exists in the air-supply conduit (4).

4. The piston-type internal-combustion engine according to claim 3, characterized in that the shut-off valve (18) is connected to a controllable actuating drive (23).

5. The piston-type internal-combustion engine according to claim 4, characterized in that the actuating drive (23) is embodied to be controlled as a function of pressure.

6. The piston-type internal-combustion engine according to claim 3, characterized in that the shut-off valve (18) is embodied as a check valve.

7. A method for influencing the energy components of the air flowing in the air-supply conduit, the components being present in the form of pressure fluctuations of the vacuum generation in an internal-combustion engine having cylinder valves, which can be actuated completely variably by way of a valve timing (2) and are connected to an air-supply conduit (4), which is provided with a device (6) for generating a vacuum by utilizing energy components of the air flowing through the air-supply conduit (4), the device being provided with controllable elements for adapting to changes in the flow energy as dictated by operating conditions, the device further being connected to at least one vacuum consumer (8, 9, 10) by way of at least one vacuum line (7); the method being characterized in that the valve timing actuates the opening and closing times of at least the gas-intake valves so as to intensify the pressure fluctuations occurring in the air-supply conduit (4) as a function of the operating conditions.

8. The method according to claim 7, characterized in that a pressure pulse that intensifies the vacuum component of the periodic pressure fluctuations of the air flowing in the air-supply conduit (4) is generated by the actuation of the gas-intake valves with a delayed intake opening.

9. The method according to claim 7, characterized in that a pressure pulse that intensifies the overpressure component of the periodic pressure fluctuations of the air flowing in the air-supply conduit (4) is generated by an actuation of the gas-exhaust valves with an "early exhaust closure," and an actuation of the gas-intake valves by an "intake open" in the region of the upper dead-center position.

* * * * *